(12) United States Patent
Teague et al.

(10) Patent No.: US 9,876,873 B1
(45) Date of Patent: Jan. 23, 2018

(54) CACHING TECHNIQUES

(71) Applicant: Perfect Sense, Inc., Reston, VA (US)

(72) Inventors: Charles Teague, Leesburg, VA (US); David Gang, Oakton, VA (US); Hyoo Lim, Herndon, VA (US); Jeremy Collins, Leesburg, VA (US)

(73) Assignee: Perfect Sense, Inc., Reston, VA (US)

( * ) Notice: Subject to any disclaimer, the term of this patent is extended or adjusted under 35 U.S.C. 154(b) by 271 days.

(21) Appl. No.: 14/918,982

(22) Filed: Oct. 21, 2015

(51) Int. Cl.
| | | |
|---|---|---|
| *G06F 15/16* | (2006.01) | |
| *H04L 29/08* | (2006.01) | |
| *H04L 12/26* | (2006.01) | |
| *G06F 17/30* | (2006.01) | |

(52) U.S. Cl.
CPC .... *H04L 67/2842* (2013.01); *G06F 17/30864* (2013.01); *G06F 17/30896* (2013.01); *H04L 43/0864* (2013.01); *H04L 67/02* (2013.01)

(58) Field of Classification Search
CPC .................................................. H04L 67/2842
See application file for complete search history.

(56) References Cited

U.S. PATENT DOCUMENTS

| | | | |
|---|---|---|---|
| 5,897,634 A | 4/1999 | Attaluri | |
| 6,055,572 A | 4/2000 | Saksena | |
| 6,078,943 A | 6/2000 | Yu | |
| 6,185,608 B1 | 2/2001 | Hon | |
| 6,487,641 B1 | 11/2002 | Cusson | |
| 6,697,849 B1 | 2/2004 | Carlson | |
| 7,624,126 B2 | 11/2009 | Pizzo | |
| 7,698,411 B2 | 4/2010 | Burckart | |
| 7,765,196 B2 | 7/2010 | Papanyan | |
| 7,797,298 B2 | 9/2010 | Sareen | |
| 8,560,509 B2 | 10/2013 | Xia | |
| 8,775,550 B2 | 7/2014 | Jeyaseelan | |
| 8,959,179 B2 | 2/2015 | Reeser | |
| 2003/0120752 A1 | 6/2003 | Corcoran | |
| 2004/0044731 A1 | 3/2004 | Chen | |
| 2004/0073604 A1 | 4/2004 | Moriya | |

(Continued)

FOREIGN PATENT DOCUMENTS

WO   WO2012139328 A1   10/2012

OTHER PUBLICATIONS

Ricardo Baeza-Yates et al., "The Impact of Caching on Search Engines," SIGIR 2007 Proceedings, Session 8: Managing Memory, Jul. 23-27, 2007, Amsterdam, The Netherlands, pp. 183-190.

(Continued)

*Primary Examiner* — Michael Y Won
*Assistant Examiner* — Nicholas Celani
(74) *Attorney, Agent, or Firm* — Fish & Richardson P.C.

(57) ABSTRACT

In some implementations, caching techniques may be employed by a web server that receives various requests from remotely-located client devices, retrieves requested results from an on-site database server, and transmits the results back to the client devices. These caching techniques generally relate to caching retrieved results at the web server such that the web server may be able to directly provide client devices with results without having to retrieve them from the database server every time a request is received. Application of these techniques may improve response times and provide back-end bandwidth savings.

16 Claims, 10 Drawing Sheets

(56) References Cited

U.S. PATENT DOCUMENTS

| | | | | |
|---|---|---|---|---|
| 2012/0072588 | A1* | 3/2012 | Kamath | G06F 9/505 709/224 |
| 2012/0297010 | A1* | 11/2012 | Zhang | H04L 67/2842 709/213 |
| 2013/0159627 | A1* | 6/2013 | Shea | G06F 12/0897 711/122 |

OTHER PUBLICATIONS

Kin Yeung Wong et al., "Site-Based Approach to Web Cache Design," City University of Hong Kong, http://computer.org/internet/, IEEE Internet Computing, Sep.-Oct. 2001, pp. 28-34.

John Peterson, "Server-Side Caching Options," ASP 101 Server-Side Caching Options, https://web.archive.org/web/20040206204052/http://www.asp101.com/articles/john/server_side_caching/index.asp, Apr. 1, 2015, 4 total pages.

Patricia Correia Saraiva et al., "Rank-Preserving Two-Level Caching for Scalable Search Engines," fpcs,edleno,nivio,meira,rfonseca,berthierg@dcc.ufmg.br, SIGIR'01, Sep. 9-12, 2001, New Orleans, Louisiana, USA, pp. 51-58.

Evangelos P. Markatos, "On Caching Search Engine Query Results," Institute of Computer Science (ICS), Foundation for Research & Technology—Hellas (FORTH), In Proceedings of the 5th International Web Caching and Content DeliveryWorkshop, May 2000, markatos@csi.forth.gr, 14 total pages.

Khalil Amiri et al., "DBProxy: A dynamic data cache forWeb applications," IBM T.J. Watson Research Center, amirik@us.ibm.com, Hawthorne, NY, p. 1-11.

Anindya Datta et al., "A Comparative Study of Alternative Middle Tier Caching Solutions to Support Dynamic Web Content Acceleration," Proceedings of the 27th VLDB Conference, Roma, Italy, 2001, 4 total pages.

Derrick Pisani, "Caching Dynamic Content from Syndicated Web Sites.," Department of Computer Science and AI University of Malta, Jun. 2002, 83 total pages.

K. Y. Wong et al., "Bypassing Proxy: a Solution to Overloaded Web Caching Systems," Proceedings of the 5th WSEAS International Conference on Applied Computer Science, Hangzhou, China, Apr. 16-18, 2006 (pp. 750-755).

Tiziano Fagni et al., "Boosting the Performance of Web Search Engines: Caching and Prefetching Query Results by Exploiting Historical Usage Data," ACM Transactions on Information Systems, vol. 24, No. 1, Jan. 2006, pp. 61-78.

K.-Y. Wong et al., "Alternative web caching design: a site-based approach," www.ietdl.org, IET Commun., 2010, vol. 4, Iss. 12, pp. 1504-1515.

Qiong Luo et al., "Active Query Caching for Database Web Servers," Computer Sciences Department, University of Wisconsin-Madison, {qiongluo,sekar,yunrui,cao,naughton}@cs.wisc.edu, 20 total pages.

Brian D. Davison, "A Web Caching Primer," Department of Computer Science, Rutgers, The State University of New Jersey (USA), http://www.cs.rutgers.edu/~davison/, Copyright IEEE Reprinted from IEEE InternetComputing,vol. 5,No. 4, Jul./Aug. 2001, pp. 38-45.

Jia Wang, "A Survey of Web Caching Schemes for the Internet," Cornell Network Research Group (C/NRG) Department of Computer Science, Cornell University, Ithaca, NY, ACM SIGCOMM, Computer Communication Review, pp. 36-46.

John Peterson, "A Simple Method for Caching HTTP Requests," ASP 101—A Simple Method for Caching HTTP Requests, https://web.archive.org/web/20040204231158/http://www.asp101.com/articles/john/httpcaching/default.asp, Apr. 1, 2015, 3 total pages.

\* cited by examiner

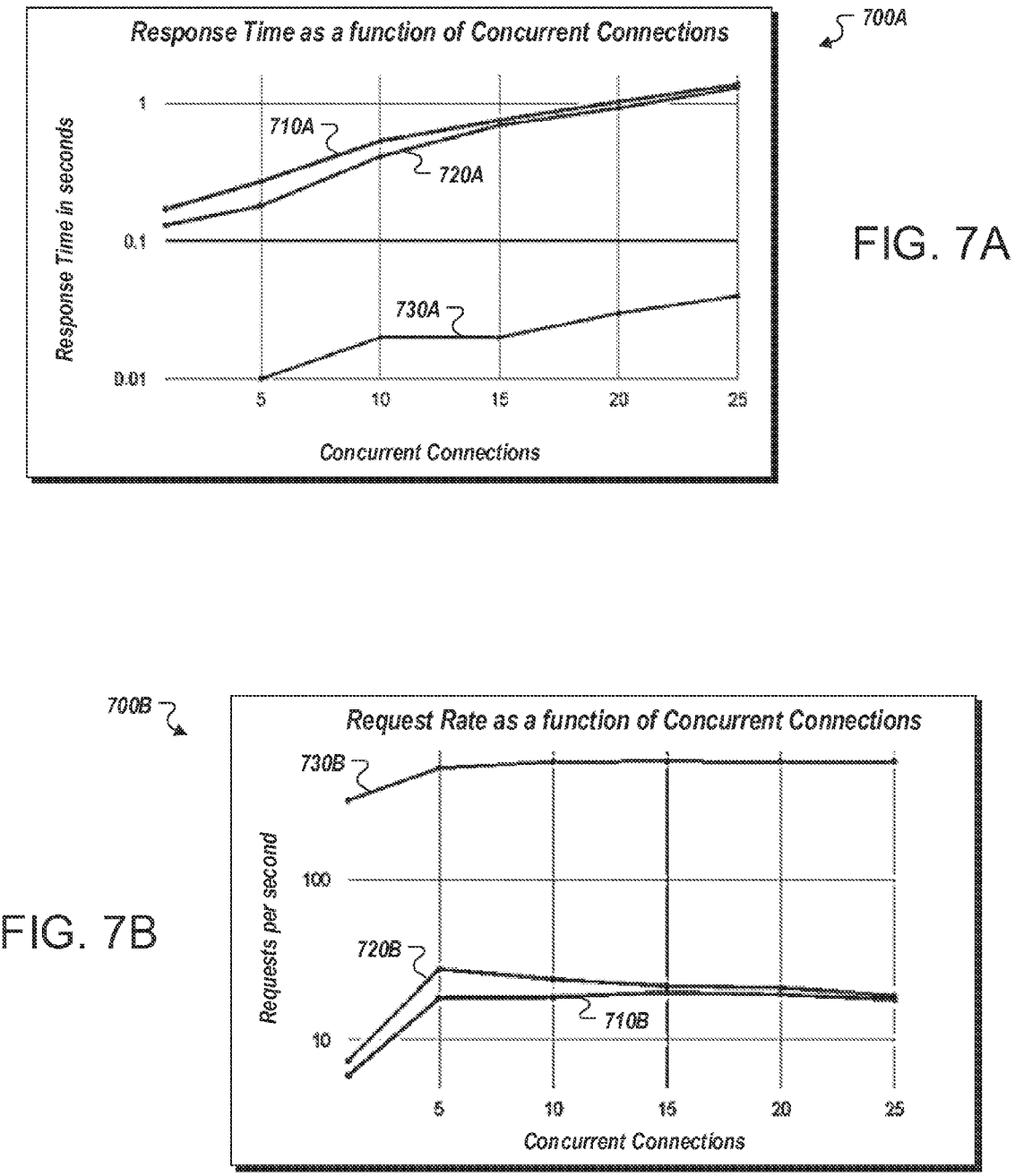

CACHING TECHNIQUES

BACKGROUND

Advances in mobile communications technologies have increased the number of avenues of user Internet access. Users are now able to access and interact with web content using a variety of different communication devices (e.g., smart phones, personal computers, personal digital assistants (PDAs), etc.), and are doing so with increasing regularity. As such, the back-end technologies that provide web content to users are being increasingly relied upon.

SUMMARY

In some aspects, the subject matter described in this specification may be embodied in methods that may include the actions of receiving, at a first time, a first request for information associated with a particular web resource, performing a process of responding to the first request that includes retrieving information associated with the particular web resource from one or more databases, determining that the process of responding to the first request took longer to perform than a first threshold amount of time, receiving a second request for information associated with the particular web resource, determining that the second request is received within a predetermined amount of time after the first time, performing a process of responding to the second request that includes retrieving information associated with the particular web resource from one or more databases, and caching information retrieved in the process of responding to the second request in response to (i) determining that the process of responding to the first request took longer to perform than the first threshold amount of time, and (ii) determining that the second request is received within a predetermined amount of time after the first time.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, receiving the first request for information associated with the particular web resource may include receiving a first HTTP GET request for information associated with the particular web resource, and receiving the second request for information associated with the particular web resource may include receiving a second HTTP GET request for information associated with the particular web resource.

Implementations may include determining that the first HTTP GET request corresponds to a particular cache key, and in response to determining that the process of to the first HTTP GET request took longer to perform than the first threshold amount of time, indexing the particular cache key. In some implementations, indexing the particular cache key may include indexing the particular cache key for the predetermined amount of time. In response to receiving the second HTTP GET request associated with the particular web resource, methods may, in some examples, include the actions of determining that (i) the second HTTP GET request corresponds to the particular cache key, and (ii) the particular cache key has been indexed. In these examples, caching information retrieved in the process of responding to the second HTTP GET request may include caching information retrieved in the process of responding to the second HTTP GET request in response to determining that (i) the second HTTP GET request corresponds to the particular cache key, and (ii) the particular cache key is indexed. Implementations may include normalizing one or more headers of the first HTTP GET request. In these implementations, determining that the first HTTP GET request corresponds to the particular cache key may, for instance, include determining that the first HTTP GET request corresponds to the particular cache key based on the normalization of the one or more headers of the first HTTP GET request.

In one aspect, receiving the first HTTP GET request for information associated with the particular web resource may include receiving the first HTTP GET request for a first set of information associated with the particular web resource, and receiving the second HTTP GET request for information associated with the particular web resource may include receiving the second HTTP GET request for a second set of information associated with the particular web resource that is different from the first set of information associated with the particular web resource. In some examples, methods that may further include the actions of receiving a third HTTP GET request for information associated with the particular web resource and performing a process of responding to the third HTTP GET request that includes retrieving the cached information associated with the particular web resource. In some implementations, receiving the second HTTP GET request for the second set of information associated with the particular web resource may include receiving, from a client device, the second HTTP GET request for the second set of information associated with the particular web resource, and retrieving information associated with the particular web resource from one or more databases may include retrieving the second set of information associated with the particular web resource from one or more databases. In these implementations, methods may further include the action of sending the second set of information associated with the particular web resource to the client device. In addition, caching information retrieved in the process of responding to the second HTTP GET request may include caching a downgraded version of the second set of information associated with the particular web resource.

In some examples, after caching information retrieved in the process of responding to the second request, methods may further include the actions of determining that a rate at which requests for information associated with the particular web resource are being received satisfies one or more criteria and, in response to determining that the rate at which requests for information associated with the particular web resource are being received satisfies the one or more criteria, performing another process that includes retrieving information associated with the particular web resource from one or more databases. In one aspect, methods further may include the actions of determining whether the other process took longer to perform than the first threshold amount of time and, in response to determining that the other process took longer to perform than the first threshold amount of time, replacing the cached information associated with the particular web resource with information retrieved in the other process. In some of these examples, methods further may include the actions of determining whether the other process took longer to perform than the first threshold amount of time and, in response to determining that the other process did not take longer to perform than the first threshold amount of time, flushing the cached information associated with the particular web resource. In some implementations, after caching information retrieved in the process of responding to the second request, methods may further include the actions of determining whether an age of the cached information associated with the particular web resource is (i) less than an upper threshold age, and (ii) greater than a lower threshold age. In these implementations, determining that the rate at which requests for information associated with the particular web resource are being received satisfies one or more criteria may, for instance, include determining that the rate at which requests for information associated with the particular web resource are being received satisfies one or more criteria in response to determining that the age of the cached information associated with the particular web resource is (i) less than an upper threshold age, and (ii) greater than a lower threshold age.

In one aspect, after caching information retrieved in the process of responding to the second request, methods may further include the actions of determining whether an age of the cached information associated with the particular web resource is less than an upper threshold age and, in response to determining that the age of the cached information associated with the particular web resource is not less than an upper threshold age, flushing the cached information associated with the particular web resource.

In some aspects, the subject matter described in this specification may be embodied in methods that may include the actions of receiving a search query from a client device, identifying, from among a set of cached search results, one or more particular cached results that are associated with the received search query, and determining whether an age of the one or more particular cached results is (i) less than an upper threshold age, and (ii) greater than a lower threshold age. In response to determining that the age of the one or more particular cached results is (i) less than the upper threshold age, and (ii) greater than the lower threshold age, methods may further include the actions of sending the one or more particular cached results to the client device and replacing the one or more particular cached results with one or more updated results that are associated with the received search query.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, in response to determining that the age of the one or more particular cached results is not (i) less than the upper threshold age, methods may further include the actions of replacing the one or more particular cached results with one or more updated results that are associated with the received query and sending the one or more updated results to the client device.

Implementations may include retrieving one or more results that are associated with the received search query from one or more databases in response to determining that the age of the one or more particular cached results is (i) less than the upper threshold age, and (ii) greater than the lower threshold age. In such implementations, replacing the one or more particular cached results with one or more updated results that are associated with the received search query may, for example, include replacing the one or more particular cached results with the one or more results retrieved from one or more databases in response to determining that the age of the one or more particular cached results is (i) less than the upper threshold age, and (ii) greater than the lower threshold age. In some implementations, in response to determining that the age of the one or more particular cached results is not (ii) greater than the lower threshold age, methods may further include sending the one or more particular cached results to the client device and refraining from retrieving one or more results that are associated with the received search query from one or more databases until determining that the age of the one or more particular cached results (i) is not less than the upper threshold age, or (ii) is greater than the lower threshold age after receiving another search query with which the one or more particular cached results are associated.

In some aspects, the subject matter described in this specification may be embodied in systems that may include a web server configured to receive requests for information associated with different web resources, retrieve information associated with different web resources to fulfill each request, selectively cache retrieved information based at least on attributes of the reception and retrieval of two or more requests, and a database server configured to provide information associated with different web resources to the web server.

Other implementations of this and other aspects include corresponding methods, apparatus, and computer programs, configured to perform the actions of the systems, encoded on computer storage devices.

These other versions may each optionally include one or more of the following features. For instance, the web server may be configured to receive requests for information associated with different web resources from different client devices and provide information retrieved from the database server to the client devices.

The details of one or more implementations are set forth in the accompanying drawings and the description below. Other features will be apparent from the description and drawings, and from the claims.

BRIEF DESCRIPTION OF THE DRAWINGS

FIG. 7A shows a graph that that reflects response time as a function of concurrent connections as exhibited in three exemplary communications systems.

FIG. 7B shows a graph that reflects request rate as a function of concurrent connections as exhibited in three exemplary communications systems.

DETAILED DESCRIPTION

The subject matter described herein generally relates to caching techniques that can be performed by a web server. The web server may receive various requests from remotely-located client devices, retrieve requested results from an on-site database server, and transmit the results back to the client devices. These caching techniques generally relate to caching retrieved results at the web server such that the web server may be able to directly provide client devices with results without having to retrieve them from the database server every time a request is received. Application of these techniques may improve the performance of such client-server computer systems by providing, in some implementations, improved response times and back-end bandwidth savings.

Figure 1:
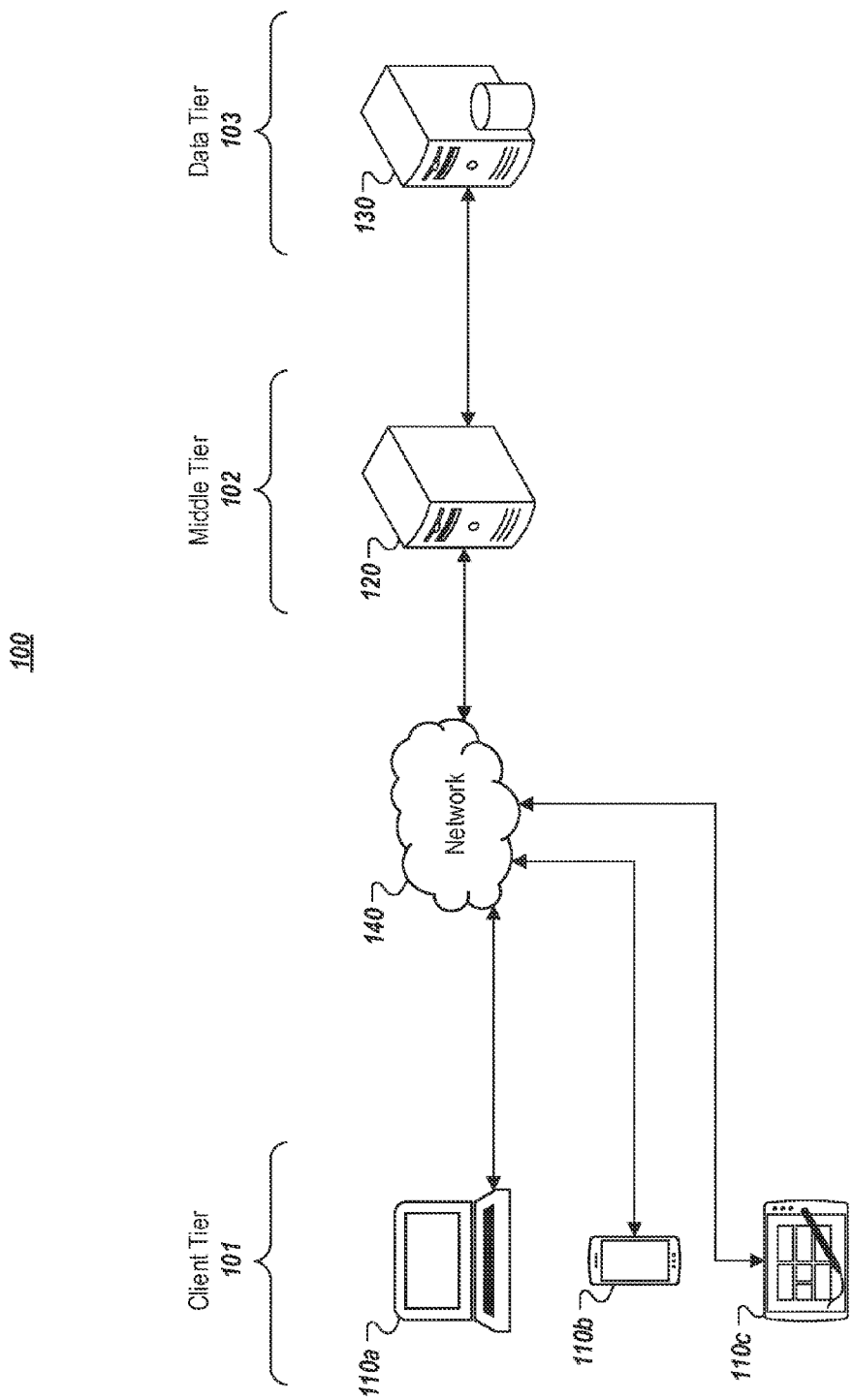
FIG. 1 is a block diagram of a communications system for providing a multi-tier web application.

Referring to FIG. 1, a communications system 100 provides a multi-tier web application through the performance of tasks at each of a client tier 101, a middle tier 102, and a data tier 103. In this example, tiers 101-103 may represent physically and/or logically independent computing platforms that are included in communications system 100. The communications system 100 may include one or more client devices 110a on the client tier 101, a web server 120 on the middle tier 102, a database server 130 on the data tier 103, and a network 140. In one general aspect, client tier 101 may send requests to middle tier 102, which services client tier 101 by making queries and updates against data tier 103.

The web server 120 (middle tier 102) may communicate with each of client devices 110a-110c (client tier 101) over the network 140 using one or more network protocols, including, but not limited to, Hypertext Transfer Protocol ("HTTP"), File Transfer Protocol ("FTP"), Remote Procedure Call ("RPC"), or other protocols. Client devices 110a-c may include mobile computing devices, personal digital assistants, cellular telephones, smart-phones, tablets, laptop, desktop, workstation, and other computing devices. The web server 120 and client devices 110a-c may, for example, be remotely located. In some implementations, the network 140 includes one or more networks, such as a local area network, a wide area network, and/or the Internet. One or more of the networks in the network 140 may be wireless, such as a cellular telephone network or a Wi-Fi network.

The web server 120 is configured to deliver web content, such as web pages, to client devices 110a-c. Such content may, for instance, be provided to the web server 120 (middle tier 102) by one or more database servers 130 (data tier 103). In some implementations, the web server 120 and database server 130 are located at a same premises. Each device on the middle and data tiers 102 and 103 may be implemented using, for example, a general-purpose computer capable of responding to and executing instructions in a defined manner, a personal computer, a special-purpose computer, a workstation, a server, or a mobile device. The devices on the middle and data tiers 102 and 103 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by devices on the middle and data tiers 102 and 103.

In operation, the web server 120 may receive messages that indicate requests for web content from any of client devices 110a-c over network. A request may originate from a web browser running on one of the client devices 110a-c, and may indicate a desired action to be performed on an identified resource, such as a file or output of an executable residing on middle tier 102 or data tier 103. In some examples, the web server 120 may receive requests including search queries and HTTP request methods (e.g., HEAD, GET, POST, etc.). For instance, client devices 110a-c may request content such as web pages, search results, Hypertext Markup Language ("HTML") data, images, style sheets, and scripts associated with the identified resource from the web server 120.

Upon receiving each message, the web server 120 may determine how to respond to the indicated request and subsequently respond to the request in the determined manner. Since the requests transmitted to web server 120 by client devices 110a-c may vary in both action and resource, the steps taken by web server 120 to respond to such requests may also vary. The source from which the web server 120 obtains content may also vary.

In some instances, the web server 120 may obtain content from database server 130, and in other instances, the web server 120 may obtain content from cache memory that is maintained by the web server 120. Database server 130 may, for example, include one or more relational database management systems ("RDBMS"). In some implementations, database server 130 may correspond to a master/slave arrangement of one or more RDBMS that perform data replication. For example, database server 130 may correspond to a master database server that is in communication with one or more MySQL databases. While the content rendered to client devices 110a-c may have been initially obtained from database server 130, the web server 120 may selectively cache content obtained for certain requests and later render the cached content to client devices 110a-c in response to receiving such certain requests.

It follows that in determining how to respond to the indicated request, the web server 120 may determine whether to obtain requested content from database server 130 or local cache memory. Logically, if the requested content has not been cached, then the web server 120 may obtain the requested content from database server 130. To do so, the web server 120 may relay the received request to database server 130 or otherwise query one or more databases associated with database server 130 for the requested content. For example, the web server 120 may provide database server 130 with one or more Structured Query Language ("SQL") queries in response to receiving a request for content.

Upon obtaining the requested content from database server 130, the web server 120 may provide the content to the particular one of the client devices 110a-c that requested the content and, in some situations, store the content in local cache memory. In such situations, the web server 120 may have determined to cache requested content based on factors such as the type of request, the time at which the request was received, traffic conditions of the middle tier 102 and data tier 103, the level of demand of the requested content, and the like. The web server 120 may also determine whether to provide one of the client devices 110*a-c* with already-cached content and/or maintain its cache according to such factors. By selectively caching content and pooling from cached content in this manner, bandwidth usage and response time may be minimized on the middle tier 102 and data tier 103.

In some implementations, the web server 120 may intercept every search query request received from client devices 110*a-c* and cache the corresponding result in memory for a particular amount of time. This amount of time may be user-defined or otherwise configurable. For example, this amount of time may be configurable by a system administrator manually setting this amount of time during system operation or after the system has otherwise been deployed. If another instance of the exact same search query request is received within the predetermined amount of time, the web server 120 may return the cached result instead of querying one or more databases by way of the database server 130. Since the result of a search query could change, results may be considered stale after the predetermined amount of time has elapsed.

This strategy may further reduce the number of database queries made by the middle tier 102 to the data tier 103 when tiers 102-103 are under concurrent load. That is, as described in further detail below in association with FIG. 2, if multiple client devices 110*a-c* are making similar requests within the predetermined amount of time of each other, the requests are funneled into a single database query.

In some implementations, the web server 120 may cache an entire HTML response of any request to which tiers 102-103 take longer than a particular amount of time to respond. This amount of time may also be user-defined or otherwise configurable. For example, this amount of time may be configurable by a system administrator manually setting this amount of time during system operation or after the system has otherwise been deployed. In these implementations, the web server 120 may track the time taken to respond to every distinct request received from client devices 110*a-c* and, upon determining that the time taken to respond to a distinct request has exceeded the particular amount of time, store the distinct request in association with the time taken to respond. In this way, the web server 120 may maintain a running list of "timed out" requests.

The sets of content rendered in response to the timed out requests can each be seen as candidates for being cached by web server 120. Upon receiving another instance of a request that matches any of the timed out requests on the list, the web server 120 may save the entire response to disk. The next time this distinct request is made, the web server 120 serves the response directly from the cache on disk. This strategy, as described in further detail below in association with FIG. 3, may function as a fail-safe mechanism in scenarios in which a relatively small number of pages receive an unusually large amount of traffic, resulting in increased response time.

Figure 2:
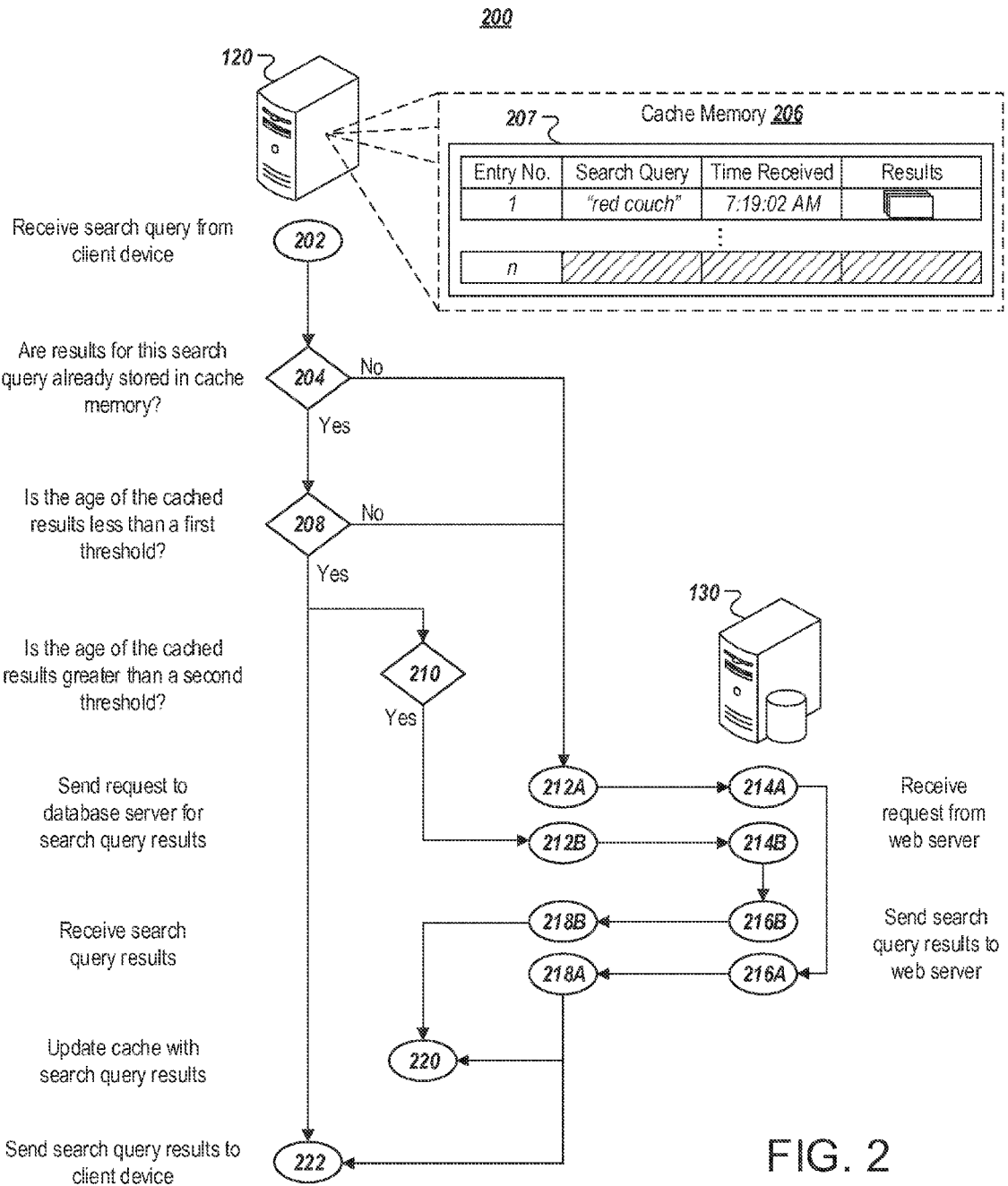
FIG. 2 is a flow chart of a process for caching results for search queries.

FIG. 2 shows a process 200 for caching results for search queries. For convenience, the process 200 shown in FIG. 2 references particular componentry described with respect to FIG. 1. However, similar methodologies may be applied in other implementations where different componentry is used to define the structure of the system, or where the functionality is distributed differently among the components shown in FIG. 1. Process 200 generally relates to a technique for caching results for search queries at a web server. As described in further detail below, the web server 120 may maintain a table within cache memory of search queries received, the time at which each search query was received by the web server, and the results retrieved from the database server in response to each search query. Every time the web server 120 receives a search query from a client device, it may access the cache memory to determine whether this search query is already included in the table.

The web server 120 receives a search query from a client device (202). This search query may, for example, be included in a message received over a network, such as that which has been described above in association with FIG. 1. Similarly, the message may be received from a client device that is similar to one of client devices 110*a-c*. For example, a web browser running on a client device may request that it be provided image content that matches a search query for "red couch."

The web server 120 determines whether results for the search query are already stored in cache memory (204). In some implementations, cache memory 206 may reside within the web server 120. In other implementations, cache memory 206 may reside on one or more other devices on middle tier 102. The web server 120 may access cache memory 206 to determine if cached results for the received search query are available. Cache memory 206 may include a table of cached content 207 that includes results that have been cached for each of multiple distinct search queries.

As depicted in FIG. 2, the results included in the table of cached content 207 may be stored in association with the search query to which the results correspond. In some implementations, the search query and corresponding results may be further stored in association with timestamp data indicating one or more of the time at which the web server 120 received the search query, the time at which the database server 130 accessed a source for the results, the time at which the web server 120 obtained the results from database server 130, and the time at which the web server 120 cached the results. In accordance with the example described above, the web server 120 may determine whether results for the "red couch" search query are already stored in cache memory 206.

If the web server 120 determines that cached results for "red couch" are indeed available, then the web server 120 may, in some implementations, further determine whether the age of the cached results for "red couch" is less than a first threshold amount of time (208). This portion of the process may serve to separate relatively stale content from relatively current content. The first threshold amount may, for example, correspond to the particular amount of time described above in association with the discussion of search query caching in reference to FIG. 1. As previously mentioned, this amount of time may be configurable, which may allow a user to control the age of the content served to client tier 101.

Timestamp data, such as that which has been described above, may be considered against current time data to determine the age of the cached results, which may in turn be considered against the first threshold amount of time. In accordance with the example described above, the web server 120 may determine whether the first threshold amount of time has elapsed since "7:19:02 AM," as indicated by the timestamp data stored in association with the cached results for the "red couch" search query. For example, the first threshold amount of time may be 1.5 seconds.

In some implementations, these age determination processes may be performed as part of regular maintenance performed on cache memory 206. In these implementations, upon determining that results for the received search query have been cached the web server 120 may forgo such age determination processes on the grounds that all content retained in cache memory 206 is of an age less than the first threshold amount.

If the web server 120 determines that the age of the cached results for "red couch" is less than the first threshold amount of time, then the web server 120 may further determine whether the age of the cached results for "red couch" is also less than a second threshold amount of time (210). The second threshold amount of time may be less than the first threshold amount of time. For example, the second threshold amount of time may be 1 second. The determination process with respect to the second threshold amount of time may be similar to that which has been described above. That is, timestamp data may again be considered against current time data to determine the age of the cached results, which may in turn be considered against the second threshold amount of time (e.g., 1 second).

Regardless of the outcome of the determination made with respect to the second threshold amount of time, the web server 120 will provide the cached content that it has identified in cache memory 206 to the client device that placed the request (222). If, however, the web server 120 determines that the age of the cached content exceeds the second threshold amount of time, then the web server 120 will both (i) provide the cached content that it has identified in cache memory 206 to the client device that placed the request (222), and (ii) update the results in cache memory 206 with fresh results obtained from database server 130 (220). For example, the cached results may be 1.2 seconds old, which is less than the first threshold amount of time (e.g., 1.5 seconds), but greater than the second threshold amount of time (e.g., 1 second). The process of updating the cache with search query results received from database server 130 (220) may include flushing the previously cached results for that search query and storing, in place of the previously cached results for that search query, the search query results most recently received from database server 130.

To obtain fresh results (218A or 218B), the web server 120 may send a request to database server 130 for results for the search query (212A or 212B). In response to receiving the request from the web server 120 (214A or 214B), the database server 130 may fetch the corresponding results and send them to the web server 120 (216A or 216B). It can be seen that the web server 120 may also follow this routine of obtaining fresh results in the event that, in determining whether the results for the received search query are already stored in cache memory (204), the web server 120 determines that there aren't any results stored in cache memory 206 for the search query that it has received. In such a situation, the web server 120 may also provide the received search query results to the client device that placed the request (222).

In some implementations, one or more of the first threshold amount of time and the second threshold amount of time may be dynamically adjustable. For example, such time thresholds may be determined based on anticipated traffic and/or concurrency of requests received by web server 120. The web server 120 may be able to handle heavy traffic for popular search queries by holding onto cached results for a longer period of time while updating the cache with fresh results in a more frequent manner. One or more signal processing or pattern recognition techniques may be applied to incoming requests for the purposes of predicting or otherwise anticipating high traffic situations. In some examples, data that indicates a performance of the web server 120 under different traffic conditions and while using different values for the first and second threshold amounts may be utilized as feedback for such dynamic adjustments.

Figure 3:
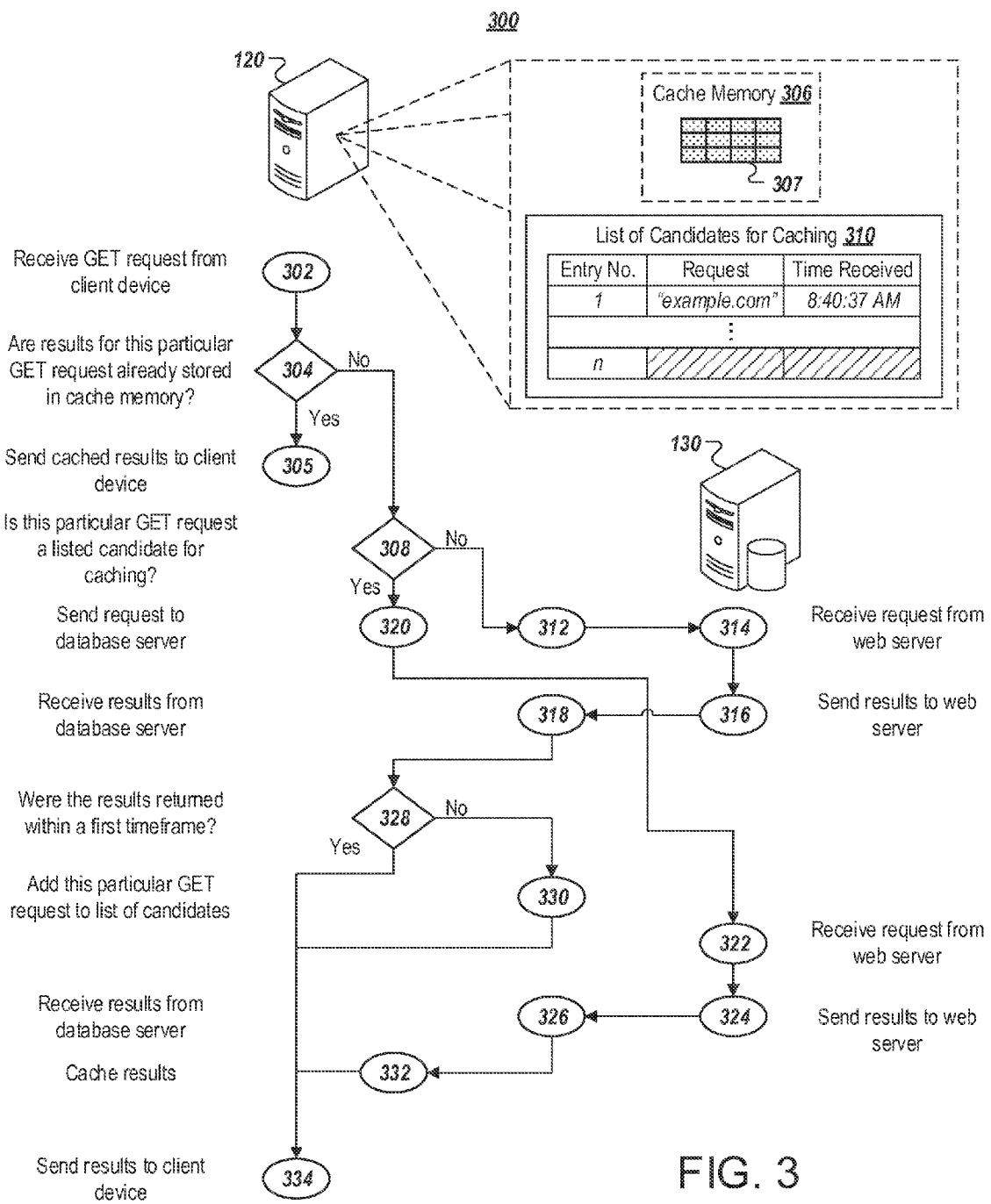
FIG. 3 is a flow chart of a process for caching results for HTTP GET requests.

FIG. 3 shows a process 300 for caching results for HTTP GET requests. For convenience, the process 300 shown in FIG. 3 references particular componentry described with respect to FIGS. 1 and 2. However, similar methodologies may be applied in other implementations where different componentry is used to define the structure of the system, or where the functionality is distributed differently among the components shown in FIGS. 1 and 2. HTTP GET requests may, for example, indicate a particular Uniform Resource Locator ("URL"). Upon receiving an HTTP GET request, the web server 120 may return a file or document that is located at the particular URL indicated in the request. Process 300 generally relates to a technique for caching results for HTTP GET requests at a web server and, in particular results for HTTP GET requests for pages that are receiving a large amount of traffic. The technique uses a hierarchical approach to dynamically allocating cache memory for HTTP GET requests based on an evaluation of the demand for particular HTTP GET requests from client devices and the load on the web server 120 and database server 130.

As described in further detail below, the web server 120 may maintain a list of HTTP GET requests received that are candidates for being cached, and the time at which each candidate request was received by the web server 120. These are requests that have taken longer than a threshold amount of time (e.g., 2 seconds or user-defined value) to retrieve results for, which may be indicative of the load on the web server and/or database server. The web server 120 may flush each entry in the list once a certain amount of time (e.g., 1 minute or user-defined value) has elapsed from the time at which each candidate request was received by the web server. The web server 120 may also maintain a table of HTTP GET requests that have been promoted from the candidate list to being stored within cache memory, including the promoted HTTP GET requests and the time at which each HTTP GET request was promoted, and the results retrieved from the database server in response to each promoted HTTP GET request.

The web server 120 receives an HTTP "GET" request from a client device (302). This request may, for example, be included in a message received over a network, such as that which has been described above in association with FIG. 1. Similarly, the message may be received from a client device that is similar to one of client devices 110*a-c*. A GET request may, for instance, indicate a request for a representation of a specified resource. Each HTTP GET request that is received by the web server 120 may be defined by a full URL including a hostname. Additionally, each HTTP GET request that is received by the web server 120 may include one or more HTTP request headers, such as cookies or Accept-Language, that can be controlled by an individual site at an object level. It can be understood that different URLs and HTTP request headers may provide for distinct GET requests. For example, a GET request for a home page of a website might include a different set of headers that makes it distinct from that of another page of the same website. In some implementations, these headers may be normalized by the web server 120 to reduce the cardinality of distinct requests per URL as described below with respect to FIG. 4A.

The web server 120 determines whether results for the particular GET request received are already stored in cache memory (304). In some implementations, cache memory 306 may reside within the web server 120. In other implementations, cache memory 306 may reside on one or more other devices on middle tier 102. The web server 120 may access cache memory 306 to determine if cached results for the received GET request are available. Cache memory 306 may include a table of cached content 307 that includes results that have been cached for each of multiple distinct HTTP GET requests. The results included in the table of cached content 307 may be stored in association with the HTTP GET request to which the results correspond. In some implementations, the HTTP GET request and corresponding results may be further stored in association with timestamp data indicating one or more of the time at which the web server 120 received the particular GET request, the time at which the database server 130 accessed a source of the results, the time at which the web server 120 obtained the results from database server 130, and the time at which the web server 120 cached the results.

If results for this particular GET requests are already stored in cache memory, then the web server 120 may retrieve the cached results and provide them to the requesting client device (305). If, however, results for this particular GET requests are not already stored in cache memory, then the web server 120 may proceed to determine whether this particular request is a listed as a candidate for caching (308). As described above in association with FIG. 1, the web server 120 may maintain a running list of timed out requests 310, for which the time taken to respond has previously exceeded the particular amount of time. The sets of content rendered in response to the timed out requests can each be seen as candidates for being cached by web server 120. The list of candidates for caching 310 may be stored in another area of memory of web server 120. The web server 120 may maintain list 310 as one or more tables or arrays within such memory, and may also store timestamp data associated with each timed out request within list 310.

If the particular GET request is not included on the list of candidates for caching 310, the web server 120 may send the request to database server 130 (312) and receive results from database server 130 (318) in response to database server 130 receiving (314) and responding to (316) its request. Although the particular GET request may not have initially been included on the list of candidates for caching 310, the web server 120 may add the particular GET request to the list of candidate for caching 310 (330) in response to determining that its corresponding results weren't returned within a first timeframe (328). In other words, the web server 120 may determine whether the particular request has timed out (328).

If the particular request has timed out, then the web server 120 may update its list of candidates for caching 310 to include the particular GET request. In this way, the web server 120 may be aware that this particular GET request has invoked a response on tiers 102 and/or 103 that has taken an undesirably long amount of time to carry out. With such information, the web server 120 may be able to determine if and when it may be beneficial to cache results for the particular GET request.

In some implementations, a process of determining whether the particular request has timed out (328) may involve tracking a handler that prepares a response to the particular GET request that has been received. More specifically, this process may include monitoring how long threads of the handler are taking. The handler may, in some examples, be a handler on tier 102 or 103 that prepares the response to each GET request received by the web server 120.

In tracking threads of the handler, a start time of one or more threads may be compared to the current time. Threads that are taking longer than a threshold amount of time, which may be representative of a response having timed out, may be easily identified using this handler tracking technique. The threshold amount of time, or the first timeframe as depicted in FIG. 3, may be user-defined or otherwise configurable. For example, the threshold amount of time and/or the first timeframe may be configurable by a system administrator manually setting the threshold amount of time and/or the first timeframe during system operation or after the system has otherwise been deployed. In some implementations, a process of determining whether the particular request has timed out (328) may additionally or alternatively involve tracking an amount of time taken for the web server 120 to receive requested results from database server 130. In these implementations, similar comparative timing techniques may be used.

In some implementations, the first timeframe may be dynamically adjustable. For example, this time threshold may be determined based on anticipated traffic and/or concurrency of requests received by web server 120. One or more signal processing or pattern recognition techniques may be applied to incoming HTTP GET requests for the purposes of predicting or otherwise anticipating high traffic situations. In some examples, data that indicates a performance of the web server 120 under different traffic conditions and while using different values for the first and second threshold amounts may be utilized as feedback for such dynamic adjustments.

Referring again to determining whether the particular HTTP GET request is listed as a candidate for caching (308), the web server 120 may, after having previously added the particular HTTP GET request to the list of candidates (330), effectively "promote" the particular HTTP GET request from list of candidates for caching 310 to cache memory 306 receiving the particular HTTP GET request once again (302 to 308). Since the list of candidates for caching 310 may be routinely updated to only include the most recently timed out requests, the particular HTTP GET request that is being promoted can be seen as not only one which has invoked an undesirably long response time, but also one which is in relatively high demand. Accordingly, the web server 120 may determine to cache results for the particular HTTP GET request (332).

To obtain results (326), the web server 120 may send a request to database server 130 for results for the HTTP GET request (320). In response to receiving the request from the web server 120 (314), the database server 130 may fetch the corresponding results and send them to the web server 120 (316). It can be seen that the web server 120 may then cache these results (332) and also provide them to the requesting client device (334). In some implementations, another handler may be utilized that captures the response on tiers 102-103 in memory and sends the response to the requesting client device. In these implementations, this other handler may be utilized in place of the handler described above for processes associated with the particular HTTP GET request for which results have been cached.

Figure 4A:
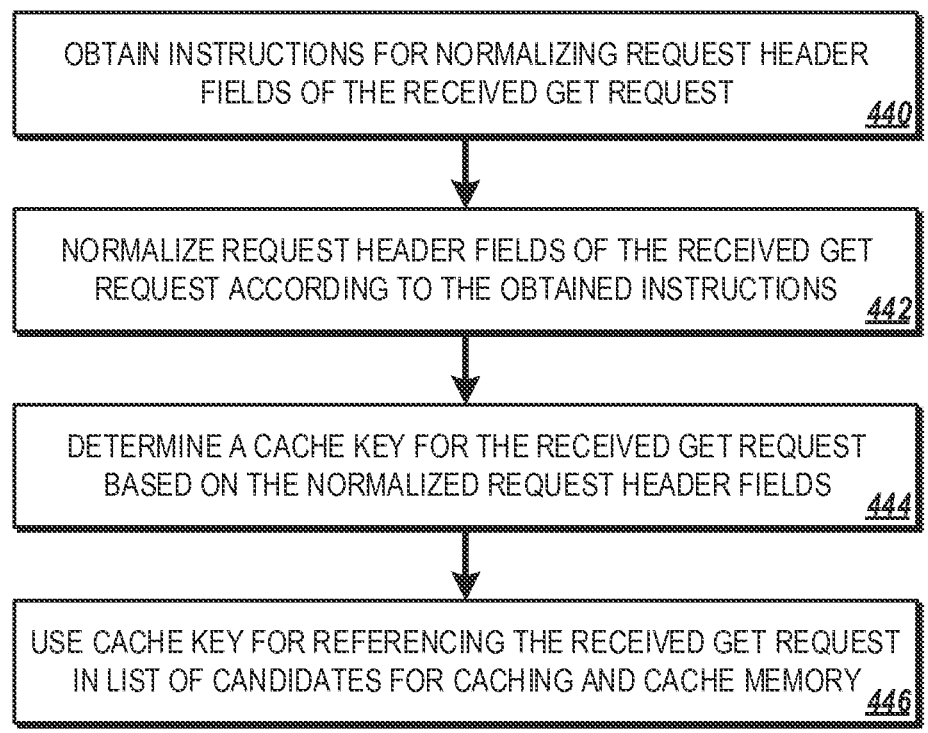
FIG. 4A is a flow chart of a process for tracking timed out responses in association with caching downgraded results for HTTP GET requests.

FIG. 4A shows a process 400A for tracking timed out responses in association with caching downgraded results for HTTP GET requests. For convenience, the process 400 shown in FIG. 4 references particular componentry described with respect to FIGS. 1-3. However, similar methodologies may be applied in other implementations where different componentry is used to define the structure of the system, or where the functionality is distributed differently among the components shown in FIGS. 1-3.

In some implementations, the web server 120 may seek to cache downgraded, rather than full, versions of requested results. A downgraded version of requested results may strip out some or all of the interactive components of the full version, such as, for example, cookies and other headers. For example, a User-Agent string, which may be used to determine whether a requesting client device requires a mobile version of a website, may be omitted in results that are cached by the web server 120. In some examples, at least a portion of the request headers that are included in cached results are normalized to downgrade the customization of the experience for end users of the requesting client devices. That is, the presentation of the cached, downgraded results may be more generic and less customized as compared to presentation of a full version of the requested results. In this way, the web server 120 may be able to render the exact same set of cached content in response to each of multiple requests for different non-normalized content. In other words, the web server 120 may direct distinct requests to the same cached content as long as their only differences pertain to components which have been stripped away or normalized. This technique may reduce the cardinality of distinct requests per URL and enhance the efficiency of the caching techniques described herein and provide memory savings to cache memory 306. These dynamic downgrades to end-user experience and/or interactive functionality of sites may also mitigate occurrences of unresponsiveness at the middle tier 102 and data tier 103. In some implementations, normalization may be performed on the basis of geographical location of each requesting client device. Such geographical locations may, for instance, be represented by and/or determined based on the Internet Protocol ("IP") address indicated by each requesting client device.

In one aspect, process 400A relates to a technique for tracking timed out responses in association with a process of caching downgraded results for HTTP GET requests, such as that of process 300 described above in association with FIG. 3. The web server 120 obtains instructions for normalizing request header fields of the received GET request (440). In some implementations, the web server 120 may obtain these instructions from an object received from database server 130. This object may represent a collection of HTTP header fields from the HTTP GET request and its corresponding response. These HTTP header fields may be components of the header section of the HTTP GET request and its corresponding response that define the operating parameters of an HTTP transaction. The received object may serve to provide the web server 120 with instructions regarding how all of the headers and/or cookies of the results for the particular GET request may be reduced down to a normalized parameter.

These instructions may, for instance, allow the web server 120 to determine one or more normalization procedures for the particular GET request. For example, these instructions may specify which headers and/or cookies may need to be retained. From this information, the web server 120 may determine which headers and/or cookies may not need to be retained and may, instead, be stripped away or normalized. That is, the web server 120 may determine how relatively unique GET requests may be grouped to correspond to a single set of cached results.

In some implementations, the web server 120 may request that database server 130 provide an object for a particular GET request in response to receiving the particular GET request from a client device. In these examples, the web server 120 may, later on, separately request that database server 120 provide results for the particular GET request. In other implementations, the web server 120 may request that database server 130 provide an object and results for the particular GET request at substantially the same time. In these implementations, the web server 120 may retain the objects it receives from database server 130 such that, later on, it may be able to independently perform normalization and cache key generation processes. In some implementations, the web server 120 may be provided with one or more objects or otherwise programmed with the instructions described in association with one or more objects, by means other than database server 130.

The web server 120 normalizes request header fields of the received GET request according to the obtained instructions (442). This may include converting contents of request headers, such as a User-Agent string, Accept-Language, or one or more cookies, into a standard format. In some implementations, the web server 120 may produce a normalized version of the received GET request in which one or more of its contents are normalized in standard format. The normalized version of the received GET request may, for example, include one or more of a host name, a URL including query parameters, normalized HTTP request headers, and original HTTP request headers. The web server 120 determines a cache key for the particular GET request based on the normalized request header fields (444). Since the web server 120 may seek to direct a variety of GET requests to a single set of downgraded results, the cache key determined by the web server 120 may be representative of all GET requests to which the normalized results correspond. In some implementations, the cache key determined by the web server 120 may indicate some or all of the request headers of the normalized results. In other implementations, the cache key determined for the particular GET request may include at least the normalized version of the particular GET request. In some examples, the cache key determined for the particular GET request may consist of the normalized version of the particular GET request.

The web server 120 uses the cache key for referencing the received GET request in the list of candidates for caching, as well as cache memory (446). This may include evaluating the cache key determined for the received GET request against the contents of cache memory 306 and list of candidates for caching to determine whether the received GET request corresponds to results that have been or should be cached.

For example, the cache key determined based on the normalized request header fields may serve as a pointer or identifier for the results associated with the list of candidates for caching 310. The cache keys determined for each received GET request may be added to the list of candidates for caching 310 in the event that they invoke a response that times out. In this way, the list of candidates for caching 310 may, in some examples, be simply seen as a list of cache keys. Similarly, in the event that a candidate included on list 310 were to be promoted to cache memory 306, the table of cached content 307 may include the normalized results. Accordingly, each set of normalized results may be stored in association with a corresponding cache key in the table of cached content 307 and may be stored in cache memory 306 in association with the generated cache key.

Figure 4B:
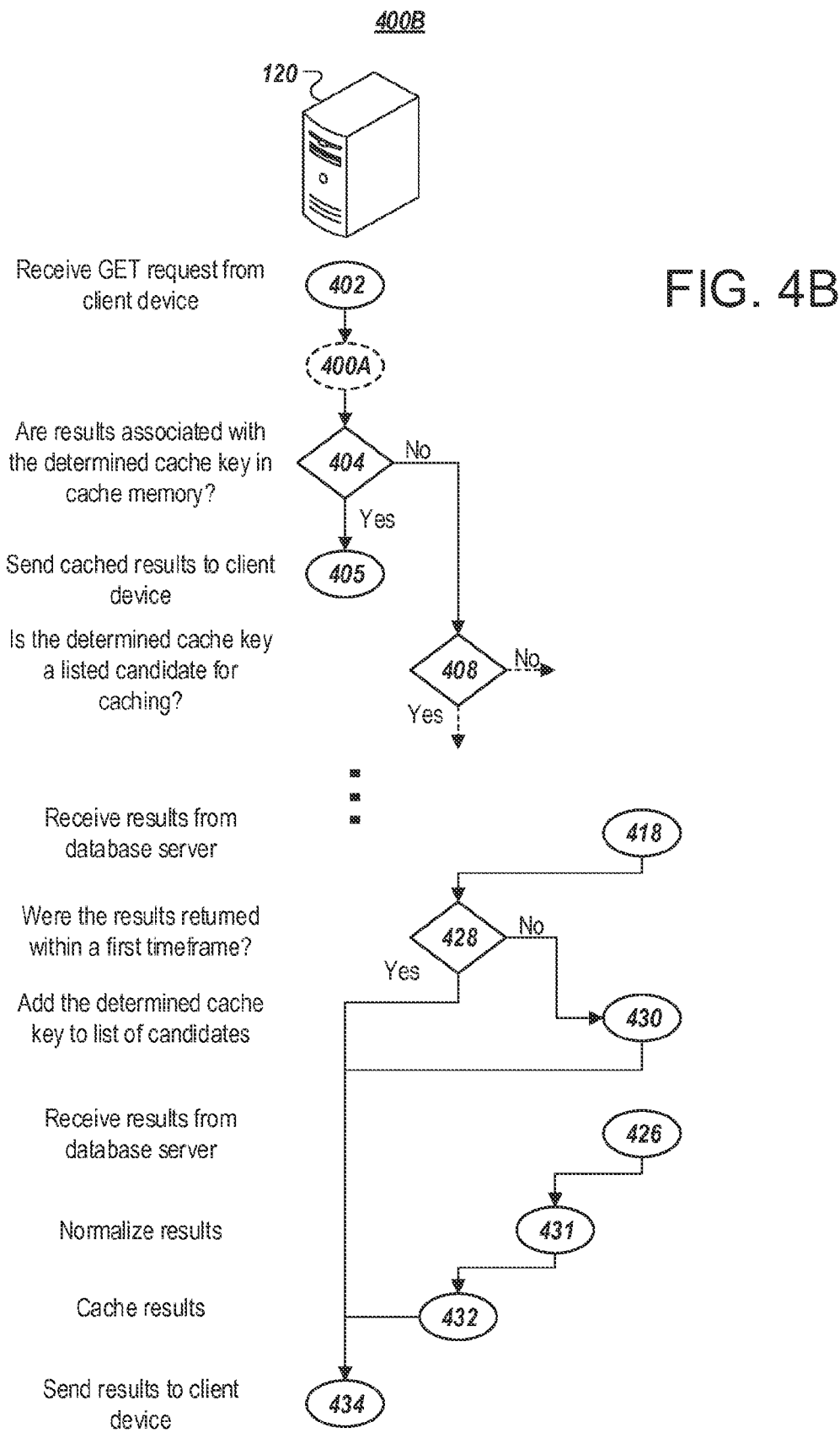
FIG. 4B is a flow chart of a process for caching downgraded results for HTTP GET requests.

FIG. 4B shows a process 400B for caching downgraded results for HTTP GET requests. For convenience, the process 400 shown in FIG. 4 references particular componentry described with respect to FIGS. 1-4A. However, similar methodologies may be applied in other implementations where different componentry is used to define the structure of the system, or where the functionality is distributed differently among the components shown in FIGS. 1-4A. In one general aspect, process 400B may be considered similar to that of an example of process 300 in which a technique for tracking timed out responses, such as that of process 400A, is employed.

The web server 120 receives an HTTP "GET" request from a client device (402). This request may, for example, be included in a message received over a network, such as that which has been described above in association with FIG. 1. Similarly, the message may be received from a client device that is similar to one of client devices 110a-c.

The web server 120 may then perform process 400A. This may, for instance, initially involve requesting an object from database server 130 or otherwise obtaining instructions for normalizing request header fields of the GET request that the web server 120 has received. After normalizing request header fields of the particular GET request received by the web server 120 and determining a cache key that is representative of the normalized request, the web server 120 may determine whether there are any results in cache memory 306 that correspond to the determined cache key (404). In other words, the web server 120 may evaluate the determined cache key against the contents of cache memory 306 in order to determine whether normalized results corresponding to the GET request have already been cached.

Following this determination, the web server 120 may either send normalized results to the requesting client device if they are available in cache memory (405) or proceed to determine whether the determined cache key is listed as a candidate for caching (408). As described above in association with FIGS. 1 and 3, the web server 120 may maintain a running list of timed out requests 310, for which the time taken to respond has previously exceeded the particular amount of time. In the example of FIGS. 4A-B, each timed out request may be represented on list 310 by their respective cache keys. The sets of content rendered in response to the timed out requests, as represented in list 310 by cache keys, can each be seen as candidates for being cached by web server 120.

Regardless of the outcome of the determination as to whether the determined cache key is listed as a candidate for caching (408), the web server 120 may retrieve results for the particular GET request with the assistance of database server 130 (418) or (426). If the cache key determined for the received GET request is not included on the list of candidates for caching 310, but invokes a response time that exceeds the first timeframe (428), the web server 120 may add the cache key determined for the received GET request to the list of candidates for caching 310 (430). Accordingly, the web server 120 may store each cache key in its running list in association with timestamp data indicating one or more of the time at which the web server 120 received the particular GET request, the time at which the database server 130 accessed a source of the results, the time at which the web server 120 obtained the results from database server 130, and the time at which the web server 120 cached the normalized results. The list of candidates for caching 310, as populated with cache keys generated by the web server 120, may reside in, for example, random access memory ("RAM") of the web server 120 or cache memory 306.

Referring again to determining whether the particular HTTP GET request is listed as a candidate for caching (408), the web server 120 may, after having previously added the cache key determined for the particular HTTP GET request to the list of candidates (430), effectively "promote" the particular HTTP GET request from list of candidates for caching 310 to cache memory 306 receiving the particular HTTP GET request once again (402 to 408). Since the list of candidates for caching 310 may be routinely updated to only include cache keys determined for the most recently timed out requests, the particular HTTP GET request that is being promoted can be seen as not only one which has invoked an undesirably long response time, but also one which is in relatively high demand.

Accordingly, the web server 120 may determine to cache downgraded results for the particular HTTP GET request. The web server 120 normalizes the received results (431) in order to obtain the downgraded results that correspond to the cache key. This may include standardizing and/or omitting portions of the received results, as specified by the instructions utilized by the web server 120 as described above. The web server 120 stores the normalized results in cache memory 306 in association with the determined cache key (432). The web server 120 sends the results to the requesting client device (434). In some examples, the web server 120 may provide the full set of results to the requesting client device. In other examples, the web server 120 may provide the downgraded results to the requesting client device.

Figure 5:
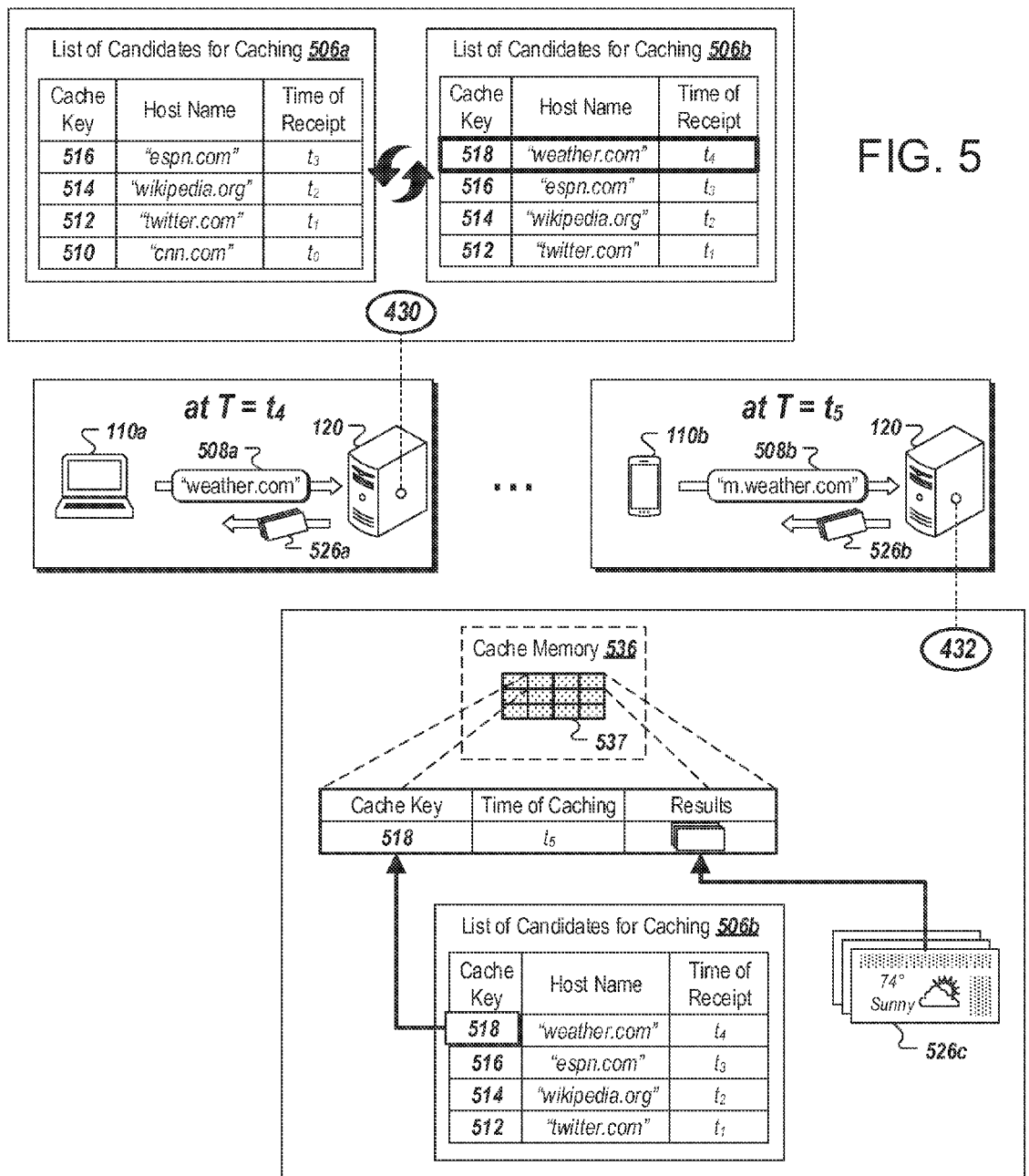
FIG. 5 is a conceptual diagram of an exemplary framework for caching results for HTTP GET requests in a system.

FIG. 5 is a conceptual diagram of an exemplary framework for caching results for HTTP GET requests in a system 500. For convenience, the diagram depicted in FIG. 5 references particular componentry described with respect to FIGS. 1-4B. However, similar methodologies may be applied in other implementations where different componentry is used to define the structure of the system, or where the functionality is distributed differently among the components shown in FIGS. 1-4B.

More particularly, the diagram depicts client device 110a, client device 110b, and web server 120. The diagram also depicts a flow of information represented by cache key 518 through a list of candidates for caching and cache memory, as maintained by system 500, in various time-sequenced stages. As described above, the web server 120 may maintain a list of (i) cache keys corresponding to received HTTP GET requests for sets of results that are candidates for being cached, and (ii) the time at which each candidate request was received by the web server 120. These are requests that have taken longer than a threshold amount of time (e.g., 2 seconds or user-defined value) to retrieve results for, which may be indicative of the load on the web server 120 and/or database server 130.

The web server 120 may flush each entry in the list once a certain amount of time (e.g., 1 minute or user-defined value) has elapsed from (ii) the time at which each candidate request was received by the web server 120. The web server 120 may also maintain a table of cache keys corresponding to received HTTP GET requests that have been promoted from the candidate list to being stored within cache memory, including (i) the promoted cache keys corresponding to received HTTP GET requests and (ii) the time at which each cache key was promoted, and (iii) the results retrieved from database server 130 for the HTTP GET request to which each promoted cache key corresponds. These results may, for instance, be normalized results similar to those which have been described above in reference to FIGS. 4A-B.

Consider an example, as depicted in FIG. 5, in which the web server 120 receives an HTTP GET request 508a from client device 110a. More specifically, the web server 120 receives a request from client device 110a for the home page of "weather.com" at time t4. When the web server 120 receives HTTP GET request 508a, it may access the cache memory to determine whether the "weather.com" home page is already cached. In some implementations, the web server 120 may determine a cache key 518 for HTTP GET request 508a in a manner similar to that which has been described above in reference to FIGS. 4A-B. In these implementations, the web server 120 may check its cache memory for any content associated with cache key 518.

In the event that the web server 120 is unable to locate content within its cache memory that is associated with cache key 518, it may proceed to determine whether cache key 518 is listed as a candidate for caching. In this example, the web server 120 may evaluate cache key 518 against the current list of candidates for caching 506a as maintained by web server 120. It can be seen that the current list of candidates for caching 506a includes cache keys 510, 512, 514, and 516, which correspond to pages of "cnn.com," "twitter.com," "wikipedia.org," and "espn.com," respectively. Each of cache keys 510-516 may represent recently-received HTTP GET requests which yielded timed out responses on the middle tier and/or data tier.

In this example, it can be seen that cache key 518 is not included in list of candidates for caching 506a. In response to determining that cache key 518 is not included in list of candidates for caching 506a, the web server 120 may (i) proceed to process HTTP GET request 508a and retrieve results 526a for client device 110a, which may, for instance, include the "weather.com" home page, and (ii) determine whether the retrieval of results 526a takes longer than the threshold amount of time to execute. This determination may be similar to that which has been described above in association with FIGS. 3 and 4B at 328 and 428, respectively.

In the event that the web server 120 determines that the "weather.com" home page does indeed take longer than the threshold amount of time to retrieve, as is the case in the example of FIG. 5, then the web server 120 may determine to add cache key 518 to its list of candidates for caching. This determination may, for example, indicate that the web server 120 and/or database server 130 are under substantial load. As depicted in FIG. 5, this process of adding a cache key to the list of candidates for caching may be similar to that which has been describe above in association with FIGS. 3 and 4B at 330 and 430, respectively.

The list of candidates for caching 506b, as depicted in FIG. 5, may be indicative of the list of candidates for caching immediately following time t4. It can be seen that the web server 120 updated its running list to at least include cache key 518. It is to be further noted that, following the update performed by web server 120, the list of candidates for caching 506b is without cache key 510. For example, the entry corresponding to cache key 510 may have been removed as a result of cache key 510 having been promoted to cache memory or as a result of one or more routine flushing procedures. That is, the entry corresponding to cache key 510 may have been flushed as a result of a threshold amount of time having elapsed since to, the time of receipt of the GET request for the "cnn.com" home page.

The web server 120 may provide results 526a to client device 110a immediately after fetching them. That is, the web server 120 may render the "weather.com" home page to client device 110a and provide an updated list of candidates for caching 506b at substantially the same point in time.

At time $t_5$, the web server 120 receives an HTTP GET request 508b from client device 110b that requests "m.weather.com," which is a mobile version of the "weather.com" home page. Request 508b may, for instance, have originated from a browser running on the client device 110b, which in this example may be a mobile client. The web server 120 may determine a cache key for request 508b in response to receiving request 508b. In this example, the cache key determined by the web server 120 for the request 508b may be cache key 518. It is to be noted that cache key 518 was also determined for previously-received request 508a. That is, although requests 508a and 508b specifically request different results (e.g., the "weather.com" home page and the mobile version of the "weather.com" home page), for caching purposes, the web server 120 has directed both of requests 508a and 508b to the same normalized results. In this example, the results that web server 120 would potentially cache in association with cache key 518 may be results which have a normalized, omitted, or otherwise modified User-Agent string. Since the User-Agent string indicates a version of a website to be provided (e.g., desktop version, mobile version, tablet version, etc.), normalization of the User-Agent string may render the distinctions between requests 508a and 508b meaningless as the web server 120 does not consider the version requested when serving cached "weather.com" results.

The web server 120 may access the cache memory to determine whether the "m.weather.com" page is already cached. For example, the web server 120 may perform this process by checking its cache memory for any content associated with cache key 518. In the event that the web server 120 is unable to locate content within its cache memory that is associated with cache key 518, it may proceed to determine whether cache key 518 is listed as a candidate for caching. In this example, the web server 120 may evaluate cache key 518 against the current list of candidates for caching 506b as maintained by web server 120.

At time $t_5$, it can be seen that the current list of candidates for caching 506b includes cache keys 512, 514, 516, and 518, which correspond to pages of "twitter.com," "wikipedia.org," "espn.com," and "weather.com," respectively. Each of cache keys 512-518 may represent recently-received HTTP GET requests which yielded timed out responses on the middle tier and/or data tier.

It can be seen that cache key 518, which is representative of request 508b as determined by the web server 120, is indeed included in list of candidates for caching 506b. In response to determining that cache key 518 is listed as a candidate for caching, the web server 120 may (i) proceed to process request 508b by responding with results, and (ii) remove cache key 518 from its list of candidates for caching and create an entry for cache key 518 and corresponding results in the table of cached content 537 stored within cache memory 536 (e.g., a promotion). Since entries of the list of candidates for caching are flushed regularly, this condition may indicate that multiple HTTP GET requests for "weather.com" content have been received by the web server 120 within a relatively short time period. In this example, many people (e.g., users of client devices 110a and 110b) might be trying to check the forecast for an impending snow storm within the same general period of time.

Upon obtaining results for request 508b from database server 130, the web server 120 may, simultaneously or in no particular order, provide results 526b to client device 110b and store results 526c and cache key 518 to cache memory 536 as an entry in table of cached content 537. As depicted in FIG. 5, these operations may be similar to those which have been describe above in association with FIG. 4B at 434 and 432, respectively. In some examples, the results 526b that are provided to client device 110b may be a full set of results for the mobile version of the "weather.com" home page. The results 526c may, however, be results that have been normalized by the web server 120, through a process similar to that which has been described above in association with FIG. 4B at 431, in order to obtain downgraded results that correspond to cache key 518. In other examples, the results 526b that are provided to client device 110b may also be a downgraded set of results. If the web server 120 were to, within a specified window of time following the caching of results 526c, receive another HTTP GET request for "weather.com," then the web server 120 may forego communicating with database server 130 and serve results 526c from cache memory 536 to the requesting client device in response to receiving the same very HTTP GET request for the third time. As depicted in FIG. 5, these operations may be similar to those which have been describe above in association with FIG. 4B at 402 to 405. In this example, execution of operations associated with FIG. 4B at 402 to 405 by the web server 120 may have occurred as a result of there being (i) a relatively high load on the middle tier 102 and/or data tier 103, and (ii) a relatively high demand for the "weather.com" content. In some implementations, the web server 120 may query the database server 130 with a normalized version of request 508b that was used in the determination of cache key 518. In such implementations, the web server 120 may obtain results 526b from database server 130 that correspond to request 508b and obtain results 526c from database server 120 that correspond to the normalized version of request 508b.

Figure 6:
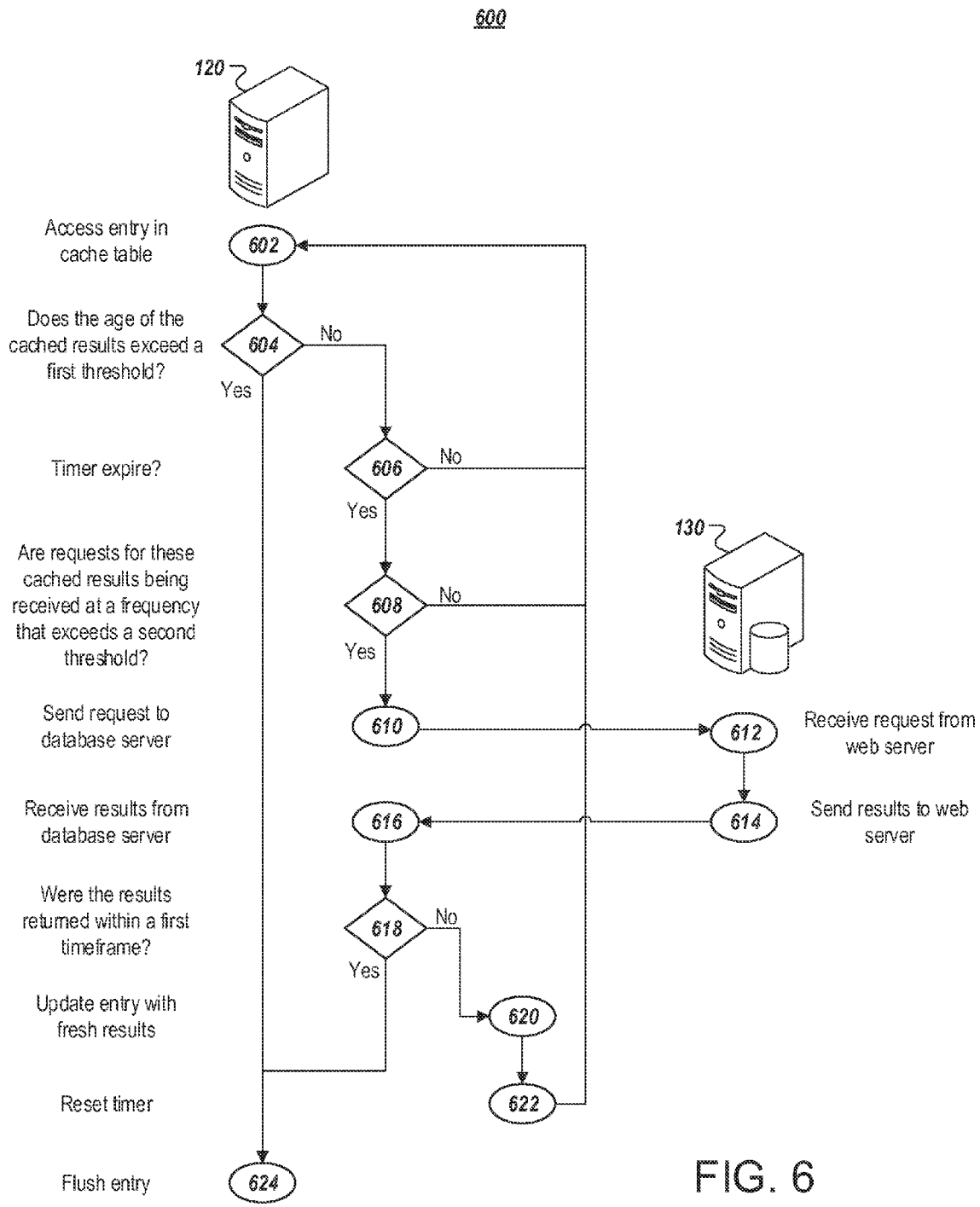
FIG. 6 is a flow chart of a process for maintaining web server cache memory.

FIG. 6 shows a process 600 for maintaining web server cache memory. For convenience, the process 600 shown in FIG. 6 references particular componentry described with respect to FIGS. 1-5. However, similar methodologies may be applied in other implementations where different componentry is used to define the structure of the system, or where the functionality is distributed differently among the components shown in FIGS. 1-5. In one general aspect, process 600 relates to maintaining web server cache memory, such as that which has been described above in association with web server 120. After caching results for a received request, the web server 120 may perform this maintenance technique in order to provide client devices 110a-c with relevant content and ensure that its memory is being allocated in an efficient manner.

As described in further detail below, the web server 120 may periodically refresh its cached results as long as it continues to periodically receive requests from client devices for the cached results. In this way, the web server 120 may keep fresh content on hand in the presence of a relatively high and steady demand for such content. If, however, the web server 120 determines that the load on the middle tier 102 and/or data tier 103 has returned to a manageable level (e.g., by monitoring the response time experienced when refreshing cached results), then the web server 120 may, even in the presence of a relatively high and steady demand for such content, remove such cached results. In the absence of a relatively high and steady demand for such content, the web server 120 may flush its cached results on a regular basis, but replenish and refresh its cached results on a relatively as-needed basis according to the requests it receives.

The web server 120 accesses an entry in cache table (602). For example, the web server 120 may access an entry in a cache table such as table of cached content 207, table of cached content 307, or table of cached content 537. The entry may correspond to a search query or an HTTP GET request, include cached results and timestamp data, and be stored in association with a search query string or cache key.

Process 600 may be executed for each of multiple cache entries maintained by web server 120. In some implementations, process 600 may be executed for every cache entry maintained by web server 120 in parallel. In this way, the cache memory of the web server 120 is regularly monitored and maintained. Accordingly, the web server 120 may scrutinize each entry using tailored or otherwise dedicated criteria that the web server 120 individually maintains for each entry, respectively. The web server 120 may determine whether the age of the cached results of the entry exceeds a first threshold (604). This portion of the process may serve to separate relatively stale content from relatively current content. The first threshold amount of time may be configurable, which may allow a user to control the age of the content served to client tier 101. For example, this first threshold amount of time may be configurable by a system administrator manually setting this first threshold amount of time during system operation or after the system has otherwise been deployed. Timestamp data, such as that which has been described above, may be considered against current time data to determine the age of the cached results, which may in turn be considered against the first threshold amount of time.

If the web server 120 determines that the cached results of the accessed entry are older than the first threshold amount of time, then the accessed entry may be flushed or otherwise removed from cache memory (624). With this maintenance, the web server 120 may prevent relatively outdated content from being rendered to client tier 101. If, however, the web server 120 determines that the age of the cached results of the accessed entry does not exceed the first threshold amount of time, then the web server 120 may proceed to determine whether a timer has expired (606).

Like the dedicated criteria described above, this timer may be utilized by the web server 120 solely for the purposes of tracking the accessed entry. The preset time at which the timer expires may be configurable. For example, this preset time may be configurable by a system administrator manually setting this preset time during system operation or after the system has otherwise been deployed. The timer can be seen as defining a maximum frequency at which cached results may be refreshed. As depicted in FIG. 6, web server 120 may continue in a holding pattern while the age of the cached results is less than the first threshold and the timer has yet to expire. In some examples, the preset time of the timer may be substantially less than the first threshold amount of time.

Upon timer expiration, the web server 120 may proceed to determine whether the frequency at which requests for the cached results are being received exceeds a second threshold (608). As indicated in FIG. 6, the web server 120 thereby determines whether to obtain fresh results from database server 130. The web server 120 may keep track the amount of requests that it receives for the cached results of the accessed entry and determine such frequency using one or more signal processing techniques. The window of time considered in frequency determination may, for example, extend back to the time at which the web server 120 received the initial request for such results which prompted caching, the time at which the database server 130 accessed a source of the cached results, the time at which the web server 120 obtained the results from database server 130, the time at which the web server 120 cached the results, or the time at which the timer was most recently set. The second threshold may be configurable by, for example, a system administrator manually setting the second threshold during system operation or after the system has otherwise been deployed.

In some implementations, one or more of the first threshold, the timer preset time, and the second threshold may be dynamically and automatically adjusted in accordance with one or more of the traffic conditions of the middle tier 102 and data tier 103, the demand for the requested content, and the like. For example, the first threshold and the timer preset time may be dynamically and automatically adjusted such that cache refreshing processes occupy less than a predetermined amount of bandwidth on the middle and data tiers 102 and 103.

As depicted in FIG. 6, web server 120 may continue in a holding pattern while the age of the cached results is less than the first threshold, the timer has expired, and the frequency at which requests for the cached results are being received does not exceed the second threshold. However, upon determining that the frequency at which requests for the cached results are being received does exceed the second threshold, the web server 120 sends a request to database server 130 for fresh results for the search query or HTTP GET request corresponding to the cached results of the accessed entry (610). As mentioned above, the web server 120 may perform this process so as to keep up with the relatively high and steady demand for these results. In response to receiving the request from the web server 120 (612), the database server 130 may fetch the corresponding results and send them to the web server 120 (614).

Upon receiving fresh results from database server 130 (616), the web server 120 determines whether the fresh results had been returned within a first timeframe (618). In other words, the web server 120 may determine whether the request has timed out. With this determination, the web server 120 may effectively reevaluate the load on middle and data tiers 102 and 103. In some implementations, a process of determining whether the particular request has timed out (618) may involve tracking a handler that prepares a response to the particular GET request that has been received. More specifically, this process may include monitoring how long threads of the handler are taking. The handler may, in some examples, be a handler on tier 102 or 103 that prepares the response to each request received by the web server 120. In tracking threads of the handler, a start time of one or more threads may be compared to the current time. Threads that are taking longer than a threshold amount of time, which may be representative of a response having timed out, may be easily identified using this handler tracking technique. The threshold amount of time, or the first timeframe as depicted in FIG. 6, may be user-defined (i.e., through manual input by a user) or otherwise configurable.

If, upon reevaluating the load on middle and data tiers 102 and 103, the web server 120 determines that the results were not returned within the first timeframe, then the web server 120 may update the accessed entry with the fresh results (620). After refreshing the cache, the web server 120 may proceed to reset the timer (622) and reinitialize process 600 so as to perform maintenance on the newly cached results (602).

If, upon reevaluating the load on middle and data tiers 102 and 103, the web server 120 determines that the results were indeed returned within the first timeframe, then the web server 120 may proceed flush the accessed entry (624). This condition may, for instance, indicate that the load on middle and data tiers 102 and 103 has subsided. Accordingly, such caching may no longer be necessary as web server 120 and database server 130 may be capable of adequately handling the current traffic. In some implementations, at least a portion of the processes described in association with FIG. 6 may be similarly applied to list of candidates for caching. That is, the web server 120 may perform regular maintenance on its running list of timed out responses using similar time-based evaluations.

FIG. 7A shows a graph 700A that reflects response time as a function of concurrent connections as exhibited in three exemplary communications systems. The exemplary communications systems may each include the same componentry and architecture, such as that of the client tier 101, middle tier 102, and data tier 103 described above with respect to FIG. 1. However, each of the three exemplary communications systems may employ a different handling technique on tiers 102-103, respectively. The y-axis of graph 700A represents response time on middle and data tiers in seconds and the x-axis of graph 700A represents the quantity concurrent connections between the middle tier and devices on the client tier. Functions 710A, 720A, and 730A, as depicted in FIG. 7A, respectively represent the characteristics of a first communications system that does not employ any of the caching techniques described above (i.e., a baseline), a second communications system that employs the search query caching technique described above with respect to FIGS. 2 and 6, and a third communications system that employs the HTTP GET request caching technique described above with respect to FIGS. 3-6. As indicated by the displacement between function 710A and functions 720A-730A, the caching techniques described herein offer improved back-end response times.

FIG. 7B shows a graph 700B that reflects request rate as a function of concurrent connections as exhibited in three exemplary communications systems. The exemplary communications systems may each include the same componentry and architecture, such as that of the client tier 101, middle tier 102, and data tier 103 described above with respect to FIG. 1. However, each of the three exemplary communications systems may employ a different handling technique on tiers 102-103, respectively. The y-axis of graph 700B represents the quantity of requests processed on middle and data tiers per second and the x-axis of graph 700B represents the quantity concurrent connections between the middle tier and devices on the client tier. Functions 710B, 720B, and 730B, as depicted in FIG. 7B, respectively represent the characteristics of a first communications system that does not employ any of the caching techniques described above (i.e., a baseline), a second communications system that employs the search query caching technique described above with respect to FIGS. 2 and 6, and a third communications system that employs the HTTP GET request caching technique described above with respect to FIGS. 3-6. As indicated by the displacement between function 710B and functions 720B-730B, the caching techniques described herein provide for reduced back-end processing load.

Figure 7C:
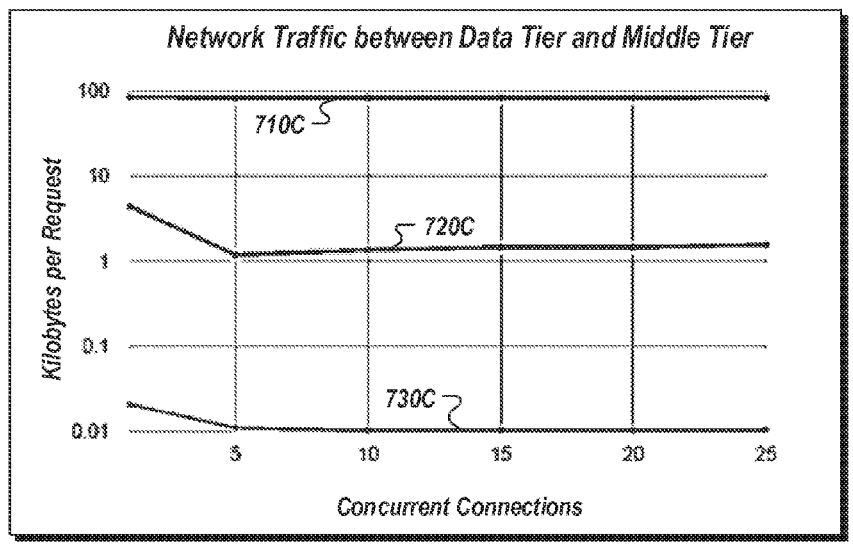
FIG. 7C shows a graph that reflects network traffic as a function of concurrent connections as exhibited in three exemplary communications systems.

FIG. 7C shows a graph 700C that reflects network traffic as a function of concurrent connections as exhibited in three exemplary communications systems. The exemplary communications systems may each include the same componentry and architecture, such as that of the client tier 101, middle tier 102, and data tier 103 described above with respect to FIG. 1. However, each of the three exemplary communications systems may employ a different handling technique on tiers 102-103, respectively. The y-axis of graph 700C represents the quantity of kilobytes transferred between the middle and data tiers per request and the x-axis of graph 700C represents the quantity concurrent connections between the middle tier and devices on the client tier. Functions 710C, 720C, and 730C, as depicted in FIG. 7C, respectively represent the characteristics of a first communications system that does not employ any of the caching techniques described above (i.e., a baseline), a second communications system that employs the search query caching technique described above with respect to FIGS. 2 and 6, and a third communications system that employs both the search query and HTTP GET request caching techniques described above with respect to FIGS. 1-6. As indicated by the displacement between function 710C and functions 720C-730C, the caching techniques described herein offer back-end bandwidth savings.

Figure 7D:
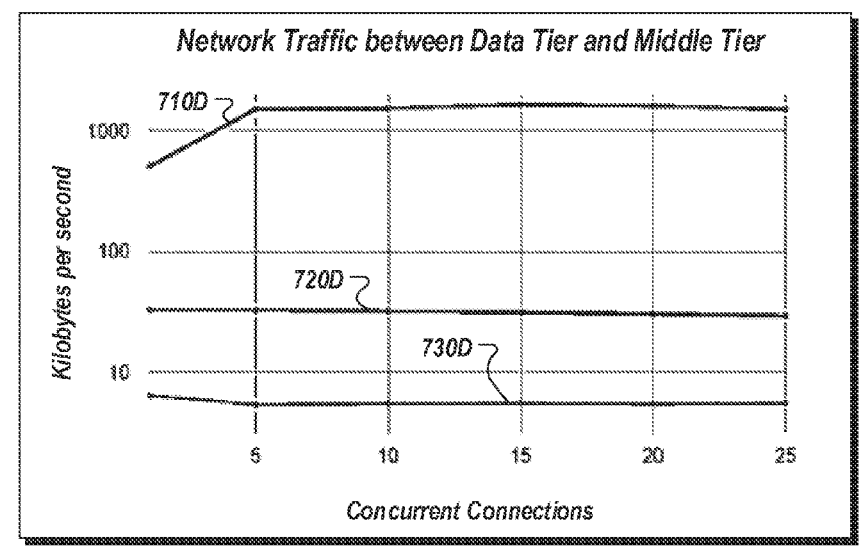
FIG. 7D shows a graph that reflects network traffic as a function of concurrent connections as exhibited in three exemplary communications systems.

FIG. 7D shows a graph 700D that reflects network traffic as a function of concurrent connections as exhibited in three exemplary communications systems. The exemplary communications systems may each include the same componentry and architecture, such as that of the client tier 101, middle tier 102, and data tier 103 described above with respect to FIG. 1. However, each of the three exemplary communications systems may employ a different handling technique on tiers 102-103, respectively. The y-axis of graph 700D represents the quantity of kilobytes transferred between the middle and data tiers per second and the x-axis of graph 700D represents the quantity concurrent connections between the middle tier and devices on the client tier. Functions 710D, 720D, and 730D, as depicted in FIG. 7D, respectively represent the characteristics of a first communications system that does not employ any of the caching techniques described above (i.e., a baseline), a second communications system that employs the search query caching technique described above with respect to FIGS. 2 and 6, and a third communications system that employs both the search query and HTTP GET request caching techniques described above with respect to FIGS. 1-6. As indicated by the displacement between function 710D and functions 720D-730D, the caching techniques described herein offer back-end bandwidth savings.

Figure 7E:
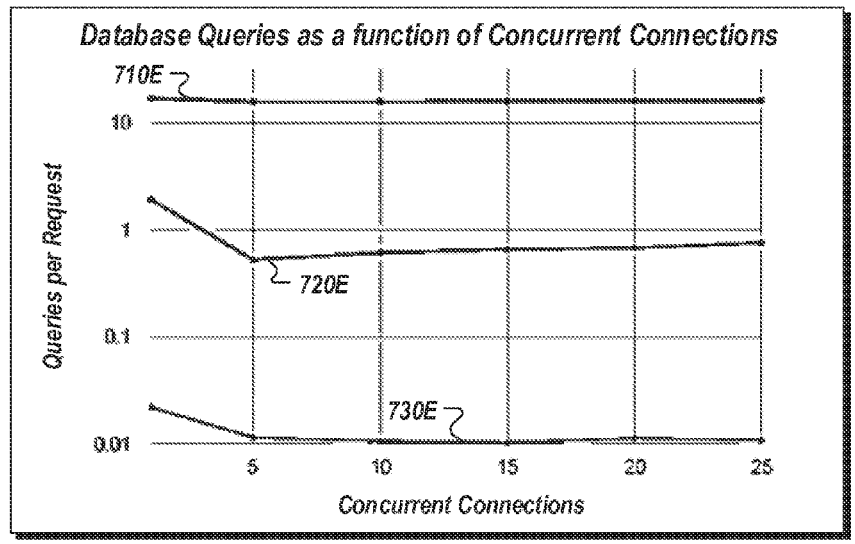
FIG. 7E shows a graph that reflects database queries as a function of concurrent connections as exhibited in three exemplary communications systems.

FIG. 7E shows a graph 700E that reflects database queries as a function of concurrent connections as exhibited in three exemplary communications systems. The exemplary communications systems may each include the same componentry and architecture, such as that of the client tier 101, middle tier 102, and data tier 103 described above with respect to FIG. 1. However, each of the three exemplary communications systems may employ a different handling technique on tiers 102-103, respectively. The y-axis of graph 700E represents the quantity of queries on the data tier per request received on the middle tier and the x-axis of graph 700E represents the quantity concurrent connections between the middle tier and devices on the client tier. Functions 710E, 720E, and 730E, as depicted in FIG. 7E, respectively represent the characteristics of a first communications system that does not employ any of the caching techniques described above (i.e., a baseline), a second communications system that employs the search query caching technique described above with respect to FIGS. 2 and 6, and a third communications system that employs both the search query and HTTP GET request caching techniques described above with respect to FIGS. 1-6. As indicated by the displacement between function 710E and functions 720E-730E, the caching techniques described herein offer back-end bandwidth savings.

Figure 7F:
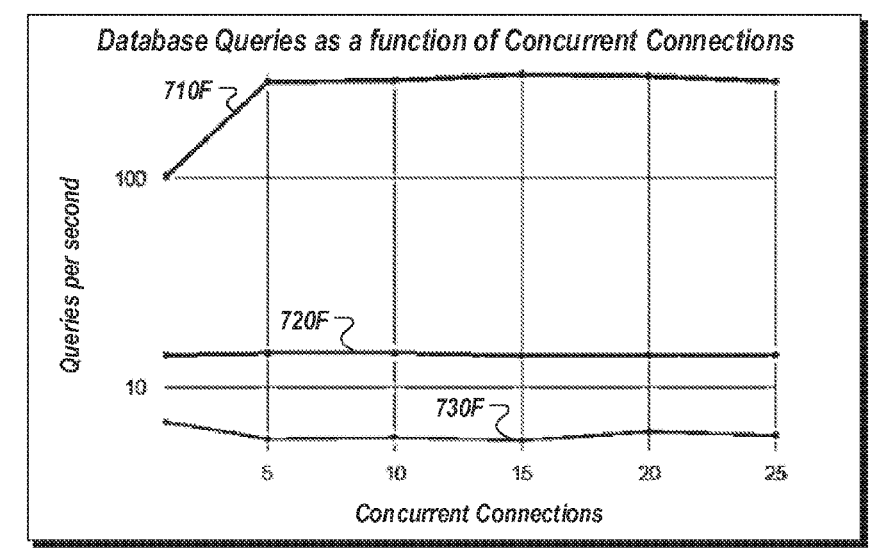
FIG. 7F shows a graph that reflects database queries as a function of concurrent connections as exhibited in three exemplary communications systems.

FIG. 7F shows a graph 700F that reflects database queries as a function of concurrent connections as exhibited in three exemplary communications systems. The exemplary communications systems may each include the same componentry and architecture, such as that of the client tier 101, middle tier 102, and data tier 103 described above with respect to FIG. 1. However, each of the three exemplary communications systems may employ a different handling technique on tiers 102-103, respectively. The y-axis of graph 700F represents the quantity of queries on the data tier per second and the x-axis of graph 700F represents the quantity concurrent connections between the middle tier and devices on the client tier. Functions 710F, 720F, and 730F, as depicted in FIG. 7F, respectively represent the characteristics of a first communications system that does not employ any of the caching techniques described above (i.e., a baseline), a second communications system that employs the search query caching technique described above with respect to FIGS. 2 and 6, and a third communications system that employs both the search query and HTTP GET request caching techniques described above with respect to FIGS. 1-6. As indicated by the displacement between function 710F and functions 720F-730F, the caching techniques described herein offer back-end bandwidth savings.

Although techniques have been described as being applied in communications systems for providing web applications, it is to be understood that the techniques described herein are equally applicable to any client-server architecture where one or more servers access one or more distinct back-end servers in responding to requests from clients. In such a system, these caching techniques could be used to speed up the responsiveness of a server to client requests. In this way, the caching techniques described herein may be applied in any communication system that includes two or more servers that function in cooperation to respond to client requests.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A computer-implemented method comprising:
    receiving, at a first time, a first request for an information associated with a particular web resource;
    performing a process of responding to the first request that includes retrieving information associated with the particular web resource from one or more databases;
    determining that the process of responding to the first request took longer to perform than a first threshold amount of time;
    receiving a second request for the information associated with the particular web resource;
    determining that the second request is received within a predetermined amount of time after the first time,
    performing a process of responding to the second request that includes retrieving information associated with the particular web resource from one or more databases; and
    caching information retrieved in the process of responding to the second request in response to (i) determining that the process of responding to the first request took longer to perform than the first threshold amount of time, and (ii) determining that the second request is received within a predetermined amount of time after the first time.

2. The computer-implemented method of claim 1, wherein:
    receiving the first request for information associated with the particular web resource comprises receiving a first HTTP GET request for information associated with the particular web resource; and
    receiving the second request for information associated with the particular web resource comprises receiving a second HTTP GET request for information associated with the particular web resource.

3. The computer-implemented method of claim 2, comprising:
    determining that the first HTTP GET request corresponds to a particular cache key; and
    in response to determining that the process of to the first HTTP GET request took longer to perform than the first threshold amount of time, indexing the particular cache key.

4. The computer-implemented method of claim 3, wherein indexing the particular cache key comprises indexing the particular cache key for the predetermined amount of time.

5. The computer-implemented method of claim 3, comprising:
    in response to receiving the second HTTP GET request associated with the particular web resource, determining that (i) the second HTTP GET request corresponds to the particular cache key, and (ii) the particular cache key has been indexed; and
    wherein caching information retrieved in the process of responding to the second HTTP GET request comprises caching information retrieved in the process of responding to the second HTTP GET request in response to determining that (i) the second HTTP GET request corresponds to the particular cache key, and (ii) the particular cache key is indexed.

6. The computer-implemented method of claim 3, comprising:
    normalizing one or more headers of the first HTTP GET request; and
    wherein determining that the first HTTP GET request corresponds to the particular cache key comprises determining, based on the normalization of the one or more headers of the first HTTP GET request, that the first HTTP GET request corresponds to the particular cache key.

7. The computer-implemented method of claim 2, wherein:
    receiving the first HTTP GET request for information associated with the particular web resource comprises receiving the first HTTP GET request for a first set of information associated with the particular web resource; and
    receiving the second HTTP GET request for information associated with the particular web resource comprises receiving the second HTTP GET request for a second set of information associated with the particular web resource that is different from the first set of information associated with the particular web resource.

8. The computer-implemented method of claim 7, further comprising:
    receiving a third HTTP GET request for information associated with the particular web resource; and
    performing a process of responding to the third HTTP GET request that includes retrieving the cached information associated with the particular web resource.

9. The computer-implemented method of claim 7, wherein:
    receiving the second HTTP GET request for the second set of information associated with the particular web resource comprises receiving, from a client device, the second HTTP GET request for the second set of information associated with the particular web resource;
    retrieving information associated with the particular web resource from one or more databases comprises retrieving the second set of information associated with the particular web resource from one or more databases; and
    the computer-implemented method further comprises sending the second set of information associated with the particular web resource to the client device.

10. The computer-implemented method of claim 9, wherein caching information retrieved in the process of responding to the second HTTP GET request comprises caching a downgraded version of the second set of information associated with the particular web resource.

11. The computer-implemented method of claim 1, further comprising:
   after caching information retrieved in the process of responding to the second request, determining that a rate at which requests for information associated with the particular web resource are being received satisfies one or more criteria; and
   in response to determining that the rate at which requests for information associated with the particular web resource are being received satisfies the one or more criteria, performing another process that includes retrieving information associated with the particular web resource from one or more databases.

12. The computer-implemented method of claim 11, further comprising:
   determining whether the other process took longer to perform than the first threshold amount of time; and
   in response to determining that the other process took longer to perform than the first threshold amount of time, replacing the cached information associated with the particular web resource with information retrieved in the other process.

13. The computer-implemented method of claim 11, further comprising:
   determining whether the other process took longer to perform than the first threshold amount of time; and
   in response to determining that the other process did not take longer to perform than the first threshold amount of time, flushing the cached information associated with the particular web resource.

14. The computer-implemented method of claim 11, further comprising:
   after caching information retrieved in the process of responding to the second request, determining whether an age of the cached information associated with the particular web resource is (i) less than an upper threshold age, and (ii) greater than a lower threshold age; and
   wherein determining that the rate at which requests for information associated with the particular web resource are being received satisfies one or more criteria comprises:
      in response to determining that the age of the cached information associated with the particular web resource is (i) less than an upper threshold age, and (ii) greater than a lower threshold age, determining that the rate at which requests for information associated with the particular web resource are being received satisfies one or more criteria.

15. The computer-implemented method of claim 1, further comprising:
   after caching information retrieved in the process of responding to the second request, determining whether an age of the cached information associated with the particular web resource is less than an upper threshold age; and
   in response to determining that the age of the cached information associated with the particular web resource is not less than an upper threshold age, flushing the cached information associated with the particular web resource.

16. A non-transitory computer-readable storage device having instructions stored thereon that, when executed by a computing device, cause the computing device to perform operations comprising:
   receiving, at a first time, a first request for an information associated with a particular web resource;
   performing a process of responding to the first request that includes retrieving information associated with the particular web resource from one or more databases;
   determining that the process of responding to the first request took longer to perform than a first threshold amount of time;
   receiving a second request for the information associated with the particular web resource;
   determining that the second request is received within a predetermined amount of time after the first time,
   performing a process of responding to the second request that includes retrieving information associated with the particular web resource from one or more databases; and
   caching information retrieved in the process of responding to the second request in response to (i) determining that the process of responding to the first request took longer to perform than the first threshold amount of time, and (ii) determining that the second request is received within a predetermined amount of time after the first time.

* * * * *